Patented Nov. 22, 1949

2,488,651

UNITED STATES PATENT OFFICE 2,488,651

HYDROXYLATED VINYL RESIN REACTED WITH CHROMIUM TRIOXIDE AND PHOSPHORIC ACID

Leo R. Whiting, East Orange, N. J., and Mark V. Goodyear, Pittsburgh, Pa., assignors to Bakelite Corporation, a corporation of New Jersey No Drawing. Application April 26, 1948, Serial No. 23,388

7 Claims. (Cl. 260—73)

This invention relates to an improved primer coating for metals including as the film-forming ingredient vinyl resins containing hydroxyl groups.

Primer coatings for metal are known which comprise solutions of vinyl resins having hydroxyl groups, in particular polyvinyl partial butyral resins, and an insoluble basic zinc chromate as a pigment. When phosphoric acid is added to a vinyl resin solution of this type, a composition is obtained from which an adherent film can be deposited on metals after air-drying, provided that the solution is used within eight to twelve hours after the addition of the phosphoric acid. If the mixture is not used within this period, the films deposited from the mixture do not adhere to metals. This necessitates that this known primer coating be marketed in two packages; one containing the pigmented vinyl resin solution, and the other containing an alcohol solution of phosphoric acid. Because of the short useful life of the mixture, the consumer must be carefully instructed as to the proper method of mixing and using the two solutions. Moreover, there are many applications, as in painting ships, docks and bridges, where it is not convenient to mix the two solutions, because of the lack of proper facilities for weighing and agitating.

According to this invention, a single package primer coating has been developed which is stable towards gelation and loss of adhesion over the period normally required in making, shipping, storing and using a primer coating. This primer coating provides an excellent base for anchoring subsequent coats of anti-corrosive, anti-fouling or other protective finishes. This primer coating is formed by treating a water-insoluble hydroxylated vinyl resin, which may be a partially hydrolyzed polymer or copolymer of a vinyl ester or a partial acetal or ether of polyvinyl alcohol, while dissolved in an organic solvent, with a mixture of chromium trioxide ($CrO_3$) and phosphoric acid. As a result of this treatment, a stable solution is obtained from which an adherent film may be deposited on metals. It is essential to use both chromium trioxide and phosphoric acid in the treatment, as the use of either one alone affords no improvement in the adhesion of the film. Also, the phosphoric acid cannot be replaced with sulfuric acid, so that it is unlikely that chromic acid is the active ingredient in the treatment. Finally, the treatment is ineffective in improving the adhesion of vinyl resins which do not contain hydroxyl groups. From these facts it may be deduced that the mixture of chromium trioxide and phosphoric acid forms some type of complex with the hydroxylated vinyl resin, which complex is more adherent to metal surfaces than the unmodified vinyl resin.

The treatment of the hydroxylated vinyl resin with the mixture of chromium trioxide and phosphoric acid is preferably carried out at 40° to 60° C. for 20 to 60 minutes. At the end of this time a clear to slightly cloudy green solution is obtained. To avoid gelation of the solution, it is necessary that the amount of phosphoric acid used in the treatment exceed the amount of chromium trioxide, although, as long as this relationship is maintained, the amount of chromic oxide and phosphoric acid may be varied considerably within the range of 0.8 to 21.2% chromium trioxide, and 3.2 to 36.1% phosphoric acid based on the total of chromic oxide, phosphoric acid, and hydroxyl-containing vinyl resin. The preferred range is 2 to 6% chromium trioxide and 4 to 12% phosphoric acid.

The order of mixing is important. Chromium trioxide should never be added alone to an organic solvent, as a serious fire may result. It is preferred to form about a 50% solution of chromic trioxide in water and add this to a solution of phosphoric acid in a suitable organic solvent, such as acetone or ethanol. This mixture is then added to a solution of a hydroxylated vinyl resin to carry out the treatment above-described. The concentration of the resin in the solution may vary from about 10 to 20% by weight. Any solvent may be used in which the hydroxylated vinyl resin is soluble. Suitable solvents for partially hydrolyzed polyvinyl acetate and polyvinyl partial acetals are alcohols, such as methanol, ethanol, isopropanol and butanol; glycol-ethers, such as ethoxy- and butoxyethanol, and esters, such as ethyl acetate. The alcohols are preferred as solvents, and alcohols containing 5 to 10% water give better results than anhydrous alcohols, as there is less tendency for the resin solution to gel during the treatment with the chromic oxide and phosphoric acid. The gel, if formed, is unstable, and converts to the liquid phase on standing or agitating. However, there are indications that films deposited from solutions which have gelled during treatment with the chromic oxide and phosphoric acid, have reduced adhesion to metals, as compared to films laid down from solutions which have not gelled during manufacture.

The hydroxyl content of the hydroxylated vinyl resins, calculated as vinyl alcohol, usually varies from 4 to 30% by weight, although the upper limit is fixed only at the point where the vinyl resins contain sufficient hydroxyl groups to be water-soluble. The following examples of suitable hydroxylated vinyl resins may be given:

Partial acetals of polyvinyl alcohol with aldehydes such as formaldehyde, acetaldehyde, propionaldehyde, butyraldehyde, valeraldehyde and hexaldehyde. The acetal resins in general may contain 3.8 to 24.2% vinyl alcohol and the butyral resin may contain from 10.0 to 24.2% vinyl alcohol.

Partially hydrolyzed polyvinyl acetate, containing 9%, 14% or 18% vinyl alcohol.

Water-insoluble partially hydrolyzed copolymers of ethylene and vinyl acetate, containing from 5 to 50% vinyl alcohol.

Partially hydrolyzed copolymers of vinyl chloride and vinyl acetate containing 70 to 92% vinyl chloride, 4 to 23% vinyl alcohol and 3 to 26% vinyl acetate.

The solution of hydroxylated vinyl resin, after the treatment with chromic oxide and phosphoric acid, may be used as a primer coating for metals without further additions, or pigments and diluents may be added. Suitable pigments for the purpose include basic zinc chromate and lead chromate. Certain of the hydroxylated vinyl resins, such as partially hydrolyzed copolymers of vinyl chloride and vinyl acetate, may be precipitated from the solution in which the treatment with chromic oxide and phosphoric acid is carried out and dried. Upon re-dissolving the treated resins, and applying the solutions to metals, an adherent film is obtained. On the other hand, the treated polyvinyl partial butyral resins cannot be re-dissolved after drying, because the dried resin is insoluble.

Upon air-drying films of the modified hydroxylated vinyl resins on metal surfaces, the resins gradually became insoluble in their original solvents. Of greater importance than the change in solubility is the fact that the adhesion of the film to the metal is maintained under severe corrosion conditions, as by subjecting the coated metal to hot, humid atmospheres or by immersing it in sea-water. Thus, the primer coating of this invention protects the over-all finish against what is termed under-film corrosion. Under-film corrosion exists when the top finish has not flaked or peeled away, but the metal underneath the film is corroding. Any of the commonly used protective finishes may be applied over the air-dried primer coating, such as maintenance paints, alkyd resin finishes, or specially formulated vinyl resin coatings.

The following examples will serve to illustrate the invention:

Example 1

Twenty (20) parts by weight of a partial acetal of polyvinyl alcohol approximately 70% acetalized with acetaldehyde were dissolved in a mixture of 162 parts of ethanol, containing 5% water by weight, and 18 parts of methanol. Another solution was prepared by adding a solution of 0.85 part of chromium trioxide in 3.7 parts of water to 2.0 parts of phosphoric acid in 18.0 parts of acetone. This mixture was slowly added with agitation to the resin solution, and the batch heated at 40–50° C. for 30 minutes. After this treatment, a green, cloudy solution was obtained. Films deposited from this solution had good adhesion to steel after air-drying for 15 hours, and after two days exposure of the air-dried panels to a warm, humid atmosphere, whereas a control film had only fair adhesion after air-drying and poor adhesion after exposure to the warm, humid atmosphere.

Example 2

To 83.3 grams of a toluene solution containing 24% by weight of a partially hydrolyzed polyvinyl acetate containing 9% OH groups calculated as polyvinyl alcohol, were added a premixed solution of chromium trioxide, 0.85 gram, water, 2.2 grams, 85% phosphoric acid, 2.0 grams, and acetone, 18.0 grams. The solution was heated at 40° C. for 20 minutes, after which a clear, green solution was obtained which did not gel or lose the adhesive quality of the resin on storage for 18 days. Films deposited from the solution had good adhesion on steel on air-drying, whereas a control film had fair adhesion.

Example 3

A solution of 4.65 parts of chromium trioxide in 9.3 parts of water was slowly added to a solution of 10.95 parts of 85% phosphoric acid in 98.6 parts of acetone. This mixture was slowly added with agitation to a solution of 109.5 parts of a polyvinyl butyral resin containing 18.3% vinyl alcohol in 622.0 parts of an alcoholic solvent mixture made up of 90 parts of 190 proof ethanol and 10 parts of methanol and maintained at 40 to 50° C. The resulting solution was heated at 40 to 50° C. for 30 minutes during which time the mixture of chromic oxide and phosphoric acid reacted with the resin to give a clear green solution. After the heating period, the solution was cooled and 145 parts of butanol were added. A film deposited from the solution thus formed had good air-dry adhesion to mild steel, galvanized iron, aluminum and chromium, whereas a control film had poor adhesion.

The solution described above was sprayed onto a smooth, steel panel and air-dried. Then one coat of a finish of the following composition was applied and air-dried:

|  | Per cent |
|---|---|
| (Copolymer of vinyl chloride, 91%, vinyl acetate, 3%, and vinyl alcohol, 6%) | 10 |
| Methyl isobutyl ketone | 45 |
| Toluene | 45 |
|  | 100 |

The panel was placed in a constant temperature room, at 70° F. and 65% relative humidity for 8 months. At the end of this time, there was no failure of the film, whereas many conventional type vinyl resin coatings fail by under-film corrosion in the test.

Example 4

A sample of the modified vinyl butyral resin solution prepared as described in Example 3 was mixed with a pigment by grinding the following composition in a pebble mill:

|  | Parts |
|---|---|
| Modified vinyl butyral resin solution of Example 3 | 73.0 |
| Basic zinc chromate | 8.6 |
| Magnesium silicate | 1.4 |
| Butanol | 17.0 |
|  | 100.0 |

This resin in this primer did not lose its adhesive quality in storage. A panel containing an air-dried film deposited from this primer coating was coated with a finish having the following composition:

| | Per cent by weight |
|---|---|
| Copolymer of vinyl chloride, 91%, vinyl acetate, 3%, and vinyl alcohol, 6% | 15.0 |
| Red lead, 97% | 22.5 |
| Methyl isobutyl ketone | 40.0 |
| Toluene | 22.5 |
| | 100.0 |

This panel was immersed in the sea for six months. At the end of this time, no corrosion of the metal or deterioration of the coating was apparent.

*Example 5*

A solution of 4.1 parts of chromium trioxide in 8.2 parts of distilled water was slowly added to a solution of 9.6 parts of 85% phosphoric acid in 87.1 parts of acetone. This mixture was slowly added to a solution of 133.0 parts of partially hydrolyzed vinyl chloride-vinyl acetate copolymer in 757.1 parts of acetone at 40–50° C. The solution was heated at 40° to 50° C. for 30 minutes and cooled. The modified resin was precipitated by the addition of a non-solvent, such as alcohol or water, washed with water, filtered and dried. A blue-green resin of fine particle size was obtained. The modified resin was re-dissolved in methyl isobutyl ketone. A film from this solution had good adhesion to galvanized iron and smooth steel, whereas a control film had poor adhesion.

The resin used in the above example was a partially hydrolyzed copolymer of vinyl chloride and vinyl acetate which has the following composition:

| | Per cent by weight |
|---|---|
| Vinyl chloride | 91.0 |
| Vinyl acetate | 3.0 |
| Vinyl alcohol | 6.0 |
| | 100.0 |

What is claimed is:

1. A normally water-insoluble vinyl resin containing hydroxyl groups attached to the chain of polymerized vinyl radicals, which has been reacted with a mixture of a minor amount of chromium trioxide and a major amount of phosphoric acid in the proportion of 0.8 to 21.2% chromium trioxide and 3.2 to 36.1% phosphoric acid based on the total of the vinyl resin, chromium trioxide and phosphoric acid.

2. A normally water-insoluble vinyl resin containing hydroxyl groups attached to the chain of polymerized vinyl radicals, which has been reacted with a mixture of a minor amount of chromium trioxide and a major amount of phosphoric acid in the proportion of 2 to 6% chromium trioxide and 4 to 12% phosphoric acid based on the total of the vinyl resin, chromium trioxide and phosphoric acid.

3. A composition as described in claim 2 in which the vinyl resin is a polyvinyl partial butyral resin containing 10.0 to 24.2% vinyl alcohol.

4. A composition as described in claim 2 in which the vinyl resin is a partially hydrolyzed copolymer of vinyl chloride and vinyl acetate, containing 70 to 92% vinyl chloride, 4 to 23% vinyl alcohol, and 3 to 26% vinyl acetate.

5. A composition as described in claim 2 in which the vinyl resin is partially hydrolyzed polyvinyl acetate containing from 9 to 18% vinyl alcohol.

6. The process which comprises adding a mixture of chromium trioxide and phosphoric acid to a solution in an organic solvent of a water-insoluble vinyl resin containing hydroxyl groups attached to the chains of polymerized vinyl radicals, in the proportions of 0.8 to 21.2% chromium trioxide and 3.2 to 36.1% phosphoric acid based on the total of the vinyl resin, chromium trioxide and phosphoric acid, the phosphoric acid in said mixture being always in excess of the chromium trioxide, and obtaining a solution of the vinyl resin characterized by improved adhesion of the resin to metals on air-drying.

7. A primer coating for metals characterized by good adhesion to metals after storage for a period of months comprising a solution in an organic solvent of a normally water-insoluble vinyl resin containing hydroxyl groups attached to the chain of polymerized vinyl radicals, which has been reacted with a mixture of a minor amount of chromium trioxide and a major amount of phosphoric acid in the proportion of 0.8 to 21.2% chromium trioxide and 3.2 to 36.1% phosphoric acid based on the total of the vinyl resin, chromium trioxide and phosphoric acid.

LEO R. WHITING.
MARK V. GOODYEAR.

No references cited.